United States Patent

McLoughlin et al.

(10) Patent No.: US 8,766,144 B2
(45) Date of Patent: Jul. 1, 2014

(54) COOKING APPLIANCE AND METHOD OF COOKING A FOOD ITEM

(75) Inventors: Keith McLoughlin, Augusta, GA (US); Margaret Mary Sterling, Madison, TN (US)

(73) Assignee: Electrolux Home Products, Inc., Charlotte, NC (US)

(*) Notice: Subject to any disclaimer, the term of this patent is extended or adjusted under 35 U.S.C. 154(b) by 1023 days.

(21) Appl. No.: 12/500,158

(22) Filed: Jul. 9, 2009

(65) Prior Publication Data

US 2010/0006558 A1    Jan. 14, 2010

Related U.S. Application Data

(60) Provisional application No. 61/080,024, filed on Jul. 11, 2008.

(51) Int. Cl.
  *A21B 1/40* (2006.01)
(52) U.S. Cl.
  USPC .............. 219/413; 219/391; 219/494; 99/331
(58) Field of Classification Search
  None
  See application file for complete search history.

(56) References Cited

U.S. PATENT DOCUMENTS

| | | | |
|---|---|---|---|
| 4,328,408 A | | 5/1982 | Lawson |
| 4,884,626 A | | 12/1989 | Filipowski |
| 5,293,019 A | * | 3/1994 | Lee ............................... 219/708 |
| 5,558,793 A | * | 9/1996 | McKee et al. .................. 219/391 |
| 6,812,437 B2 | * | 11/2004 | Levy et al. ..................... 219/507 |
| 6,987,250 B2 | * | 1/2006 | Levy et al. ..................... 219/507 |
| 7,057,142 B1 | | 6/2006 | Lubrina |
| 7,109,444 B2 | * | 9/2006 | Levy et al. ..................... 219/492 |
| 2008/0295702 A1 | * | 12/2008 | Wiedemann et al. ........... 99/325 |
| 2010/0196561 A1 | * | 8/2010 | Kling et al. .................... 426/233 |

FOREIGN PATENT DOCUMENTS

| | | |
|---|---|---|
| WO | 0170087 | 9/2001 |
| WO | 2005066547 | 7/2005 |

OTHER PUBLICATIONS

International Search Report for PCT/US2009/050205, dated Dec. 14, 2009, 3 pages.

* cited by examiner

*Primary Examiner* — Joseph M Pelham
(74) *Attorney, Agent, or Firm* — Pearne & Gordon LLP

(57) ABSTRACT

According to another aspect, the subject application involves an oven and a method of controlling an oven for cooking a food item. The oven includes a cooking cavity, a user interface comprising an input device to be actuated with a single actuation event by a cook to select a predetermined cooking mode for cooking the food item, a heating element operable to produce heat required to cook the food item within the cooking cavity, and a control unit. The method includes receiving a cooking signal in response to actuation of the input device with the single actuation event by the cook, and establishing a cooking parameter for the predetermined cooking mode based on the cooking signal. The cooking parameter can be specific to the food item to be cooked according to the predetermined cooking mode of the oven. The method also includes initiating the predetermined cooking mode associated with the input device, and detecting that cooking of the food item according to the predetermined cooking mode is complete.

17 Claims, 3 Drawing Sheets

COOKING APPLIANCE AND METHOD OF COOKING A FOOD ITEM

This application claims the benefit of U.S. Provisional Application No. 61/080,024, filed Jul. 11, 2008, which is incorporated in its entirety herein by reference.

BACKGROUND OF THE INVENTION

1. Field of the Invention

This application relates generally to a cooking appliance and method of cooking a food item in the cooking appliance, and more specifically to an oven including a predetermined setting for cooking a food item until an internal portion of the food item reaches a desired temperature for that food item to be considered fully cooked and suitable for human consumption.

2. Description of Related Art

Traditionally, to cook food items such as turkeys, chickens, roasts of beef and the like, an oven is preheated to a predetermined temperature and the food item placed within the oven cavity once the predetermined temperature is reached. A timer is set to the recommended cook time and issues an audible signal when the cook time has expired to indicate that the food item has been fully cooked to the desired degree. The desired degree of cooking corresponds to the maximum internal temperature that the food reaches while being cooked. However, the condition of the food item before being placed in the oven cavity can vary on a case by case basis. Some food items are fully frozen throughout before being cooked, and thus require a longer cooking time to reach a desired degree than a food item that has been thawed before being cooked. If such a frozen food item is to be cooked to a "well-done" state, for example, it must be cooked longer than a thawed food item for its internal temperature to reach the temperature for the food item to be considered "well done".

More recently, thermometers have been inserted into the food item to display the internal temperature of the food item. Such thermometers have a visual indicator that is triggered only when the internal temperature of the food item reaches a predetermined temperature. But such thermometers must be manually monitored by the cook regularly to avoid overshooting the internal temperature corresponding to the desired degree of cooking.

SUMMARY

According to one aspect, the subject application involves an oven for cooking a food item. The oven includes a cooking cavity for receiving the food item during cooking, a rack for supporting the food item within the cooking cavity, and at least one heating element operable to heat the cooking cavity and elevate a temperature of the food item supported on the rack within the cooking cavity. A user interface is provided, and includes an input device to be manipulated by a cook for inputting a request for activation of a predetermined cooking mode associated with the input device by using a single actuation event. A control unit is operatively connected to the user interface to receive a cooking signal in response to the single actuation event performed by the cook to request the predetermined cooking mode and initiate the predetermined cooking mode in response to receiving the cooking signal.

According to another aspect, the subject application involves a method of controlling an oven for cooking a food item, the oven including a cooking cavity, a user interface comprising an input device to be actuated with a single actuation event by a cook to select a predetermined cooking mode for cooking the food item, a heating element operable to produce heat required to cook the food item within the cooking cavity, and a control unit. The method includes receiving a cooking signal in response to actuation of the input device with the single actuation event by the cook, and establishing a cooking parameter for the predetermined cooking mode based on the cooking signal. The cooking parameter can be specific to the food item to be cooked according to the predetermined cooking mode of the oven. The method also includes initiating the predetermined cooking mode associated with the input device, and detecting that cooking of the food item according to the predetermined cooking mode is complete.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION

Figure 1:
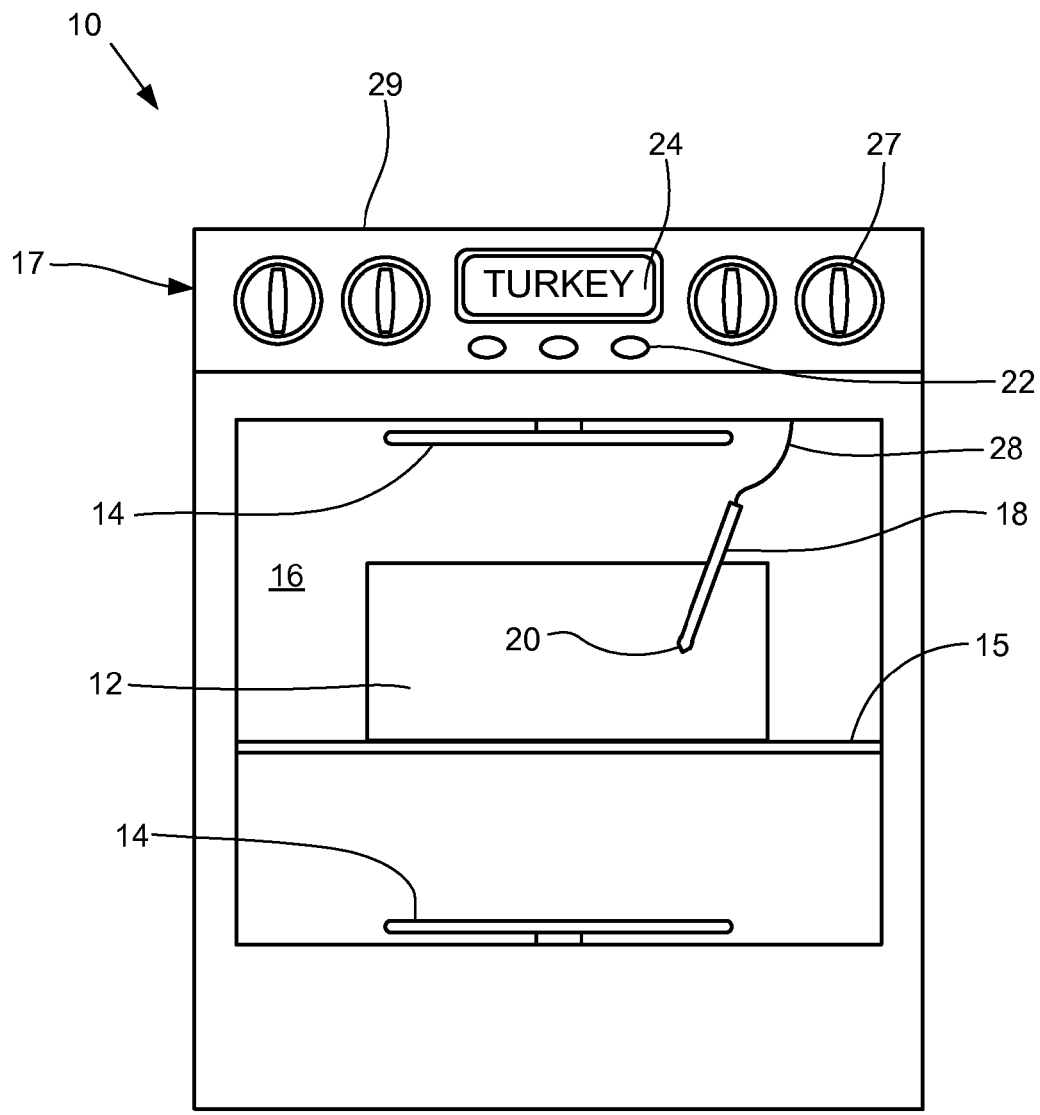
FIG. 1 shows an example of a cooking appliance in the form of an oven with a front door removed to clearly illustrate an interior of the oven cavity.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

The subject application relates to a cooking appliance and method that facilitates cooking of a food item to a desired degree. The cooking appliance is shown in FIG. 1 as a kitchen oven 10, but can instead be a crock-pot, roaster, toaster oven, or any other appliance for cooking food. Further, the food item in FIG. 1 is described as being a turkey 12, but is also not so limited, but instead can be a chicken or any other type of poultry, beef, seafood, or any other type of food that is to be cooked to a desired degree fit for human consumption.

As shown in FIG. 1, the oven 10 includes one or more heating elements 14 such as a Calrod resistive heating element, for example, for generating heat and cooking the turkey 12 resting on a rack 15 within a cooking cavity 16 of the oven 10. The rack 15 can include a rigid wire platform extending between lateral sides of the cooking cavity 16 on which the turkey 12 can rest, a pedestal suspended within the cooking cavity 16, or any other suitable food support. According to alternate embodiments, the heating elements 14 can include one or more gas burners for burning natural gas, propane, or other combustible fluid to generate the heat required to cook the turkey 12. Yet other embodiments can include one or more induction heating elements 14 that can be inductively heated to generate the heat required for cooking, or steam elements that are steam heated or emit steam to generate the heat within the cooking cavity 16 required for cooking. The heating elements 14 in FIG. 1 include both an upper element supported vertically above the rack 15 and a lower element supported vertically beneath the rack 15. To broil food on the rack 15 within the cooking cavity only the upper element is activated, and to bake the food, both the upper and lower elements are activated. The oven 10 can optionally be a convection-type oven, including a fan or other air mover for circulating air within the cooking cavity 16 to promote forced hot air impingement onto the turkey within the cooking cavity during cooking and a substantially even temperature throughout the cooking cavity 16.

A sensor such as a thermometer 18, for example, can be provided to the turkey 12 to monitor a temperature indicative of the degree to which the turkey 12 has been cooked. In FIG. 1, the thermometer includes a temperature-sensitive tip portion 20 that, when inserted into the turkey 12, senses an internal temperature of the turkey 12 in the immediate vicinity of the tip portion 20. The thermometer 18 can be inserted a desired distance into the turkey 12 to monitor the temperature in the vicinity of the thermometer 18, and it is to be assumed that further outlying portions of the turkey 12 (i.e., closer to the heating elements 14) have been cooked to a temperature that is greater than or equal to the temperature sensed in the immediate vicinity of the tip portion 20.

The oven 10 also includes a user interface 17 comprising at least one input device such as a button 22, for example, or other input device such as a knob, switch, "soft" key displayed on a display device, etc. . . . that allows a cook to perform a single actuation event to select a predetermined cooking mode. The single actuation event can include any single-step, or single action performed by the cook to actuate the input device provided to the user interface 17. For instance, a single button 22 can be pressed once by the cook, a single knob provided to the user interface 17 can be turned in one rotational motion by the cook, a single switch can be thrown once by the cook, etc. . . . According to alternate embodiments any action that can be performed on a single input device provided to the user interface 17, without requiring an additional or separate input by the cook, to select a desired, predetermined cooking mode for cooking a food item in the cooking cavity 16 can be considered a single actuation event.

The single actuation event can select a predetermined cooking mode, which can be specific to a predetermined particular food item to be cooked, can specify a predetermined cooking time, specify a predetermined cooking temperature, specify a predetermined target internal temperature of the food item, specify a predetermined desired degree of doneness, or any combination thereof. The predetermined values above are associated with the button 22 so that the predetermined values are automatically selected and established by the oven 10 in response to actuation of the button 22. The button 22 can be dedicated for the selection of a monitored cooking mode, which can be specific to a particular food item, or can be shared as in the case of computer generated soft keys (not shown) that also serve an additional purpose displayed on an electric display panel 24. For example, the button 22 can be provided to the user interface 17 and pushed by the cook to select a predetermined turkey cooking mode. When the turkey cooking mode is initiated the oven 10 establishes at least one of a preprogrammed cooking temperature, cooking time, a plurality of predetermined cooking intervals as described in detail below, an internal target temperature of the turkey, or any combination thereof. There can also optionally be a plurality of buttons 22 or other input devices, each associated with a different pre-programmed, or user-programmable food item, desired cooking temperature, desired degree of cooking, desired cooking time, cooking intervals, or any combination thereof. Moreover, the button 22 according to alternate embodiments can optionally be pushed to select the predetermined cooking mode associated with the button 22.

Upon performance of the single actuation event by the cook, the predetermined cooking mode is established as the cooking mode to be initiated. The cooking mode selected in response to the cook pressing only the button 22 (optionally pressing the button 22 only once), and optionally without requiring additional inputs to the control unit 26 transmitted in response to additional interactions with the user interface 17, can then be initiated by the cook as a separate actuation event or step via the same, or another, button or other input device provided to the user interface 17. Although selection of the cooking mode can be accomplished via a single actuation event, the selected cooking mode can be initiated by another actuation event in compliance with standards defined by a governing body such as the American National Standards Institute. For example, the button 22 can be pushed by the cook to select the turkey cooking mode, and another button (or the same button 22) provided to the user interface 17 can optionally also be pushed by the cook to activate the turkey cooking mode as a separate step. Of course any other input device other than the second button, or the same button 22 used to select the cooking mode can be manipulated by the cook to cause the oven to activate the selected cooking mode. According to such alternate embodiments, the user interface 17 can optionally also include a separate food item selection device, target cooking temperature and/or degree-of-cooking selector such as a temperature knob 27 that allows the cook to manually establish cooking parameters such as a target internal temperature for the food item in the immediate vicinity of the tip portion 20 of the thermometer 18, a timer selector for selecting a desired cooking time, and the like.

Figure 2:
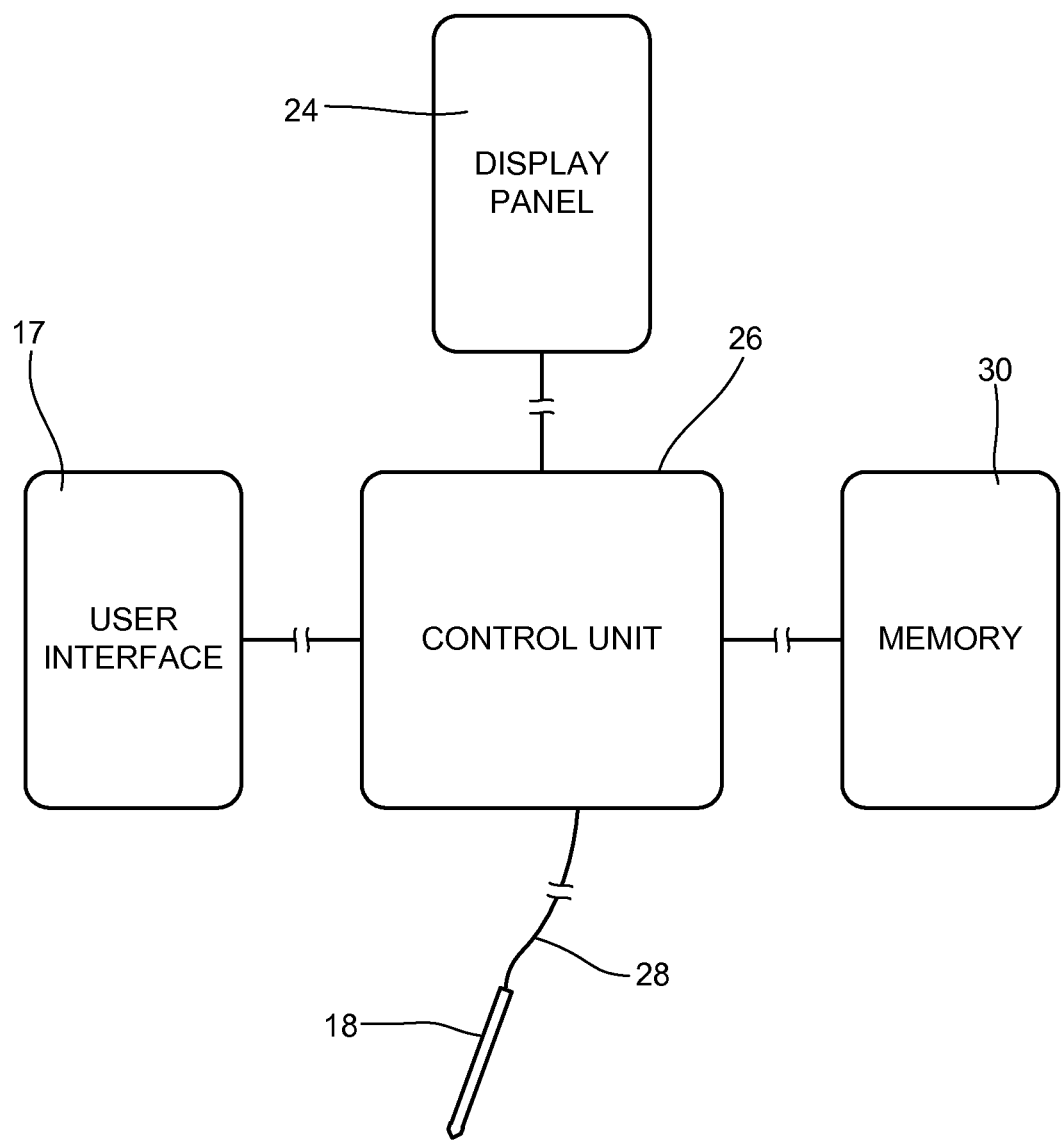
FIG. 2 is a block diagram schematically illustrating communications between a control unit and peripheral components for executing cooking of a food item according to a monitored cooking mode where active cooking is discontinued once a target internal temperature of the food item has been achieved.

The predetermined cooking mode initiated by the pressing of the button 22 or other single actuation event can be a "monitored cooking mode." The monitored cooking mode described herein controls cooking of the turkey 12 or other food item in response to a signal transmitted from the thermometer 18 to be received by the control unit 26 shown in FIG. 2 to achieve a desired internal temperature within the turkey 12. Further, references to a "degree of cooking" (also commonly referred to as "doneness") refer to different internal temperatures to which the food item is cooked. For example, for beef, the U.S. Department of Agriculture has established an internal temperature of 145° F. as a "medium rare" degree of cooking, and 160° F. as a "medium" degree of cooking. Similarly, the U.S. Department of Agriculture has established a minimum internal temperature of 165° F. for a turkey to be considered fully cooked for human consumption. Thus, the target internal temperature for the turkey 12 in the illustrative embodiments discussed with reference to the figures would be 165° F. Of course, other target internal temperatures and degrees of cooking are also within the scope of the present invention.

The thermometer 18 is operatively coupled to the control unit 26 (FIG. 2) provided to the oven 10 to automatically and without human intervention transmit a temperature indication signal that allows the control unit 26 to determine the internal temperature of the food item 12. For instance, the control unit 26, based on the temperature indication signal, can determine that the internal temperature of the turkey 12 in the immediate vicinity of the tip portion 20 of the thermometer 18 has reached a level corresponding to a desired degree of cooking and/or target internal temperature. The thermometer 18 can be at least partially inserted into the turkey 12 and hardwired to the control unit 26 with a wire 28 or other suitable electric conductor, can optionally communicate with the control unit 26 over a wireless communication channel, for example. According to alternate embodiments, the thermometer can include a so-called non-contact temperature sensor that employs a laser or other suitable illumination technique, for example, to monitor a temperature of the turkey 12 and transmit a temperature indication signal that can be utilized by the control unit 26 to determine an internal temperature of the turkey 12.

The control unit 26 can include electronic hardware required to control cooking of the turkey 12, control operation of one or more heating elements 14 provided to the oven 10, provide an audible and/or visual indication that the turkey 12 has been cooked as desired, or a combination thereof, as described herein and in response to receiving the signal transmitted by the thermometer 18 indicative of the turkey 12 reaching the target internal temperature. According to alternate embodiments, the control unit 26 can include a microprocessor that is operable to execute computer-executable instructions stored in a computer-readable memory provided to the oven 10 to perform any, all or any combination of the functions described herein. A computer-readable memory 30 shown in FIG. 2 is operatively coupled in communication with the control unit 26 and stores the computer-executable instructions to be executed in response to receiving the signal from the thermometer 18 to initiate any, all or any combination of the functions described herein. According to alternate embodiments, the computer-executable instructions can optionally be stored in a non-volatile computer-readable memory embedded within the microprocessor itself. The computer-readable memory 30 can also optionally store a database of minimum target internal temperatures for specific food items 12, and/or target internal temperatures for various degrees of cooking or "doneness" for specific food items 12.

According to an alternate embodiment, the predetermined cooking mode initiated by the pressing of the button 22 or other single actuation event can optionally include two or more "cooking intervals." The cooking intervals can be preprogrammed as part of the cooking mode, cooking the turkey 12 at a plurality of different temperatures throughout the cooking mode selected by the button 22. For example, when the button 22 is pushed and the cooking mode associated with the button 22 is subsequently initiated via a separate input from the cook, the one or more heating elements are activated to initially cook the turkey 12 at 350° F. for a first time interval such as one hour. When the one hour interval expires operation of the heating elements 14 can be adjusted to cook the turkey 12 at a temperature of 425° F. for a twenty (20 min.) minute interval. After the twenty (20 min.) minute interval the turkey 12 can be broiled (i.e., only the heating element 14 disposed adjacent the top of the cooking cavity 16 is energized) for two (2 min.) minutes to make the exterior of the turkey 12 crispy. When each of the intervals has been completed, the oven 10 can automatically deactivate the one or more heating elements 14 without intervention from the cook. Instead of deactivating the heating elements 14, alternate embodiments lower the temperature of the heating elements 14 to a degree that does not significantly further cooking of the turkey 12, but keeps the turkey 12 warm until it can be removed from the cooking cavity 16. Other embodiments issue an audible and/or visible alert to the cook indicating that the cooking intervals have been completed. Other embodiments include a combination of two or more of deactivating the heating elements, lowering the temperature of the heating elements, and issuing the audible and/or visible alert. Yet other embodiments can optionally include a plurality of cooking intervals, wherein a transition from one cooking interval to another cooking interval is initiated by the control unit 26 in response receiving a signal from the thermometer 18 indicated that the internal temperature of the turkey 12 has reached a predetermined target temperature. For instance, the interval during which the turkey 12 is cooked at 350° F. can be concluded when the internal temperature of the turkey 12 is detected to be a temperature suitable for human consumption, such as 165° F. or greater.

According to an embodiment of a method to cook the turkey 12, the cook can prepare the turkey 12 and at least partially insert the thermometer 18 into the turkey to a depth where a portion of the turkey 12 in the immediate vicinity of the tip portion 20 must reach a predetermined target temperature to be considered fully cooked. The thermometer 18 can optionally be hardwired to the control unit 26 within the cooking cavity 16 of the oven 10 and provided with a wire 28 that is long enough to allow the thermometer 18 to be inserted into the turkey 12 externally of the cooking cavity 16 (such as when the turkey 16 is supported on an optional cooktop surface 29 provided to the oven 10 as shown in FIG. 1). Alternately, the thermometer 18 includes a wire 28 that can be selectively coupled to and disconnected from the control unit 26. According to such an embodiment the thermometer 18 can be inserted into the turkey 12 externally of the cooking cavity 16 and subsequently coupled to the control unit 26 by plugging the thermometer 18 into a modular plug located within the cooking cavity 16 once the turkey 12 itself is inserted into the cooking cavity 16. Other embodiments allow the thermometer 18 to communicate with the control unit 26 over a wireless communication channel, via an optical signal, or any other suitable communication protocol that eliminates the need for the hardwired connection between the thermometer 18 and the control unit 26.

Figure 3:
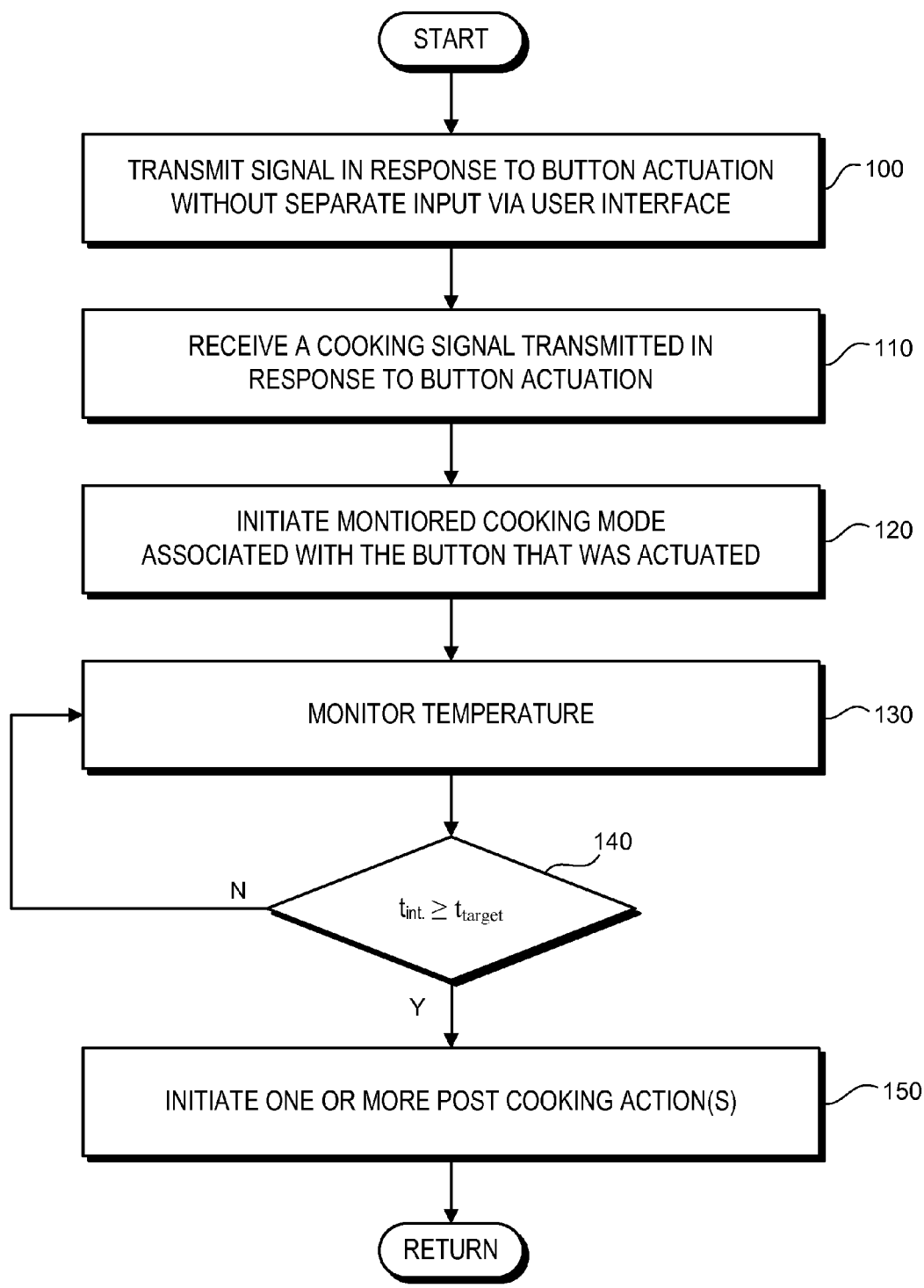
FIG. 3 is a flow diagram illustrating an embodiment of a method of controlling operation of an oven to cook a food item.

With the turkey 12 placed in the cooking cavity 16 along with the thermometer 18, the cook can press the button 22 or other otherwise select the monitored cooking mode, optionally as a single actuation event and without separate input by the cook via the user interface 17 as described in detail above. As illustrated as step 100 in FIG. 3, in response to actuation of the button 22 a signal is transmitted to the control unit 26 to indicate the desired predetermined cooking mode associated with the button 22. According to an embodiment of the method, in response to receiving at step 110 the signal transmitted in response to actuation of the button 22, the control unit 26 can initiate the monitored cooking mode, for example, at step 120. The monitored cooking mode associated with the button 22 and initiated at step 120 can have one or a plurality of cooking parameters associated with it, defining conditions to be established in response to initiation of the monitored cooking mode. For example, the monitored cooking mode initiated by actuation of the button 22 can include: a predetermined target internal temperature of the turkey 12 to be achieved before cooking is complete; a predetermined temperature of one or more heating elements 14, optionally for a predetermined period of time; a predetermined ambient temperature to be established within the cooking cavity 16, optionally for a predetermined period of time; a predetermined time for cooking the turkey 12; or any combination thereof. The cooking parameters can optionally be stored in the computer-readable memory 30, stored in the microprocessor, or otherwise made available to the control unit 26. The cooking parameters can optionally be associated with the input device such as the button 22, and specific to a food item such as the turkey 12 to be cooked according to the predetermined cooking mode of the oven 10 initiated in response to pressing the button 22.

While operating in the monitored cooking mode the oven thermometer 18 monitors at step 130 a temperature indicative of the internal temperature of the turkey 12, or other suitable temperature that can indicate complete cooking of the turkey 12. Other appropriate monitoring devices such as a timer can optionally be provided to the oven to monitor the length of time that the turkey 12 is cooked, for example. When a cooking parameter such as the desired internal temperature of the turkey 12 is satisfied, the thermometer 18 transmits the temperature indication signal to be received by the control unit 26. In response to receiving the temperature indication signal and determining that the internal temperature of the turkey 12 is greater than or equal to the target internal temperature at step 140, the control unit 26, at step 150, can initiate one or more post cooking actions. Examples of the post cooking actions include automatically, without human intervention: lowering the temperature of the heating element(s) 14, deactivating the heating element(s) 14 altogether, causing presentation of an audible and/or visible alert to the cook to indicate that the internal temperature of the turkey 12 is greater than or equal to the target internal temperature and the turkey is therefore fully cooked, or any combination thereof.

According to other embodiments, the button 22 or other input device can be pushed to cause the oven 10 to enter the monitored cook mode, and then the temperature knob 27 or other device can be used by the cook to manually set the target internal temperature of the food item 12. Yet other embodiments allow for selection of the target degree of cooking for a particular food item 12, such as medium-rare for a steak for example, with the temperature knob 27. Doing so loads the U.S. Department of Agriculture's recommended 145° F. from the database stored in the computer-readable memory 30 as the target internal temperature to be achieved before the control unit 26 lowers or deactivates the heating element(s) 14. According to alternate embodiments, the target internal temperatures corresponding to the various degrees of cooking in the database can optionally be manually entered to the cook's preference. Thus, the cook can override the 145° F. corresponding to the medium rare degree of cooking for steaks in the database, and instead, change it to 150° F. if desired. If medium rare is selected for steaks cooked in the future, the internal target temperature will be set to 150° F. instead of the default U.S. Department of Agriculture's 145° F. The monitored cooking mode can be displayed by the display panel 24, which in the present example, is displayed as "TURKEY" in FIG. 1 to indicate that a turkey 12 is being cooked to its particular target internal temperature that must be reached to be considered fully cooked.

Once cooking of the turkey 12 according to the monitored cooking mode has commenced according to the alternate embodiments, it will continue until the target internal temperature is sensed by the thermometer 18 in the immediate vicinity of the tip portion 20. At this time, a signal indicating that the target internal temperature has been sensed in the immediate vicinity of the tip portion 20 is transmitted by the thermometer 18 without user intervention. The signal, upon being communicated to the control unit 26 causes the control unit 26 to lower the temperature of the heating element(s) 14 from the cooking temperature without user intervention and accordingly, lower the amount of heat generated for cooking the turkey 12. The control unit 26 can optionally lower the temperature of the heating element(s) 14 to a low setting that keeps the fully cooked turkey warm until it is to be served but does not appreciably cook the turkey 12 any further, or discontinue operation of the heating element(s) altogether.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An oven for cooking a food item, the oven comprising:
 a cooking cavity for receiving the food item during cooking;
 a rack for supporting the food item within the cooking cavity;
 at least one heating element operable to heat the cooking cavity and elevate a temperature of the food item supported on the rack within the cooking cavity;
 a user interface comprising an input device to be manipulated by a cook for inputting a request for activation of a predetermined cooking mode specific to a type of the food item and associated with the input device by using a single actuation event, the cooking mode selected by the single actuation event being responsive to an internal property of the food item, wherein said activation of the predetermined cooking mode is requested in response to the single actuation event without requiring an additional input, separate from the single actuation event, to be entered by the cook via the user interface;
 a sensor to be at least partially inserted into the food item to sense the internal property of the food item while the food item is exposed to heat from the at least one heating element within the cooking cavity and transmit a control signal indicative of the internal property; and
 a control unit operatively connected to the sensor to receive the internal property sensed by the sensor, and the user interface to receive a cooking signal in response to the single actuation event performed by the cook to request the predetermined cooking mode and initiate the predetermined cooking mode in response to receiving the cooking signal, wherein the control unit controls the predetermined cooking mode responsive to the internal property indicated by the control signal.

2. The oven according to claim 1, wherein the input device comprises a push button and the single actuation event comprises a single push of the push button by the cook.

3. The oven according to claim 2, wherein the predetermined cooking mode is associated with the food item and establishes a desired value of the internal property of the food item when cooking of the food item is complete.

4. The oven according to claim 3, wherein the internal property of the food item comprises a target internal temperature of the food item.

5. The oven according to claim 1, wherein the control unit comprises a microprocessor, and the oven further comprises a memory operatively connected to the microprocessor, the memory storing a plurality of different desired values of the internal property to be established during the predetermined cooking mode from which the cook can make a selection.

6. The oven according to claim 5, wherein the desired values of the internal property comprises a plurality of different predetermined target internal temperatures of the food item that can be achieved during the predetermined cooking mode corresponding to different degrees of doneness.

7. The oven according to claim 1, wherein the sensor comprises a temperature sensor to be at least partially inserted into the food item and operatively connected to the control unit, wherein the temperature sensor transmits the control signal in response to detecting a condition where an internal temperature of the food item has been elevated during cooking according to the predetermined cooking mode to a temperature that is at least equal to a target internal temperature defined by the predetermined cooking mode.

8. The oven according to claim 7, wherein the input device comprises a button and the single actuation event comprises a single pressing of the button by the cook.

9. The oven according to claim 7, wherein the food item comprises a turkey, and the predetermined cooking mode is specific to the turkey and is initiated to establish a target internal temperature of the turkey that is to be achieved during cooking of at least 165° F.

10. The oven according to claim 1, wherein the control unit is adapted to, in response to the internal property of the food item being achieved, lower a cooking temperature within the oven from a cooking temperature to a lower temperature that is less than the cooking temperature and keeps the food item warm without appreciably cooking the food item beyond a degree of doneness that existed when the internal property of the food item was achieved.

11. The oven according to claim 1 further comprising a memory operatively connected to the control unit and storing a plurality of different temperatures to be established as a cooking temperature within the oven during the predetermined cooking mode selected by the single actuation event, wherein times when the different temperatures are to be established are determined based on the internal property sensed by the sensor.

12. A method of controlling an oven for cooking a food item, the oven comprising a cooking cavity, a user interface comprising an input device to be actuated with a single actuation event by a cook to select a predetermined cooking mode for cooking the food item, a heating element operable to produce heat required to cook the food item within the cooking cavity, and a control unit, the method comprising:

receiving a cooking signal in response to actuation of the input device with the single actuation event by the cook;
without requiring an additional or separate input other than the single actuation event entered via the input device by the cook, establishing a desired value of a cooking parameter for the predetermined cooking mode specific to a type of the food item based on the cooking signal, the desired value of the cooking parameter being a value of a cooking parameter specific to the food item to be considered cooked to a desired degree according to the predetermined cooking mode of the oven;
initiating the predetermined cooking mode associated with the input device;
receiving an indication of the sensed value of the cooking parameter while the food item is being cooked according to the predetermined cooking mode selected with the single actuation event, wherein the sensed value of the cooking parameter is sensed by a sensor that is at least partially inserted into the food item being cooked; and
detecting that cooking of the food item according to the predetermined cooking mode is complete when the sensed value of the cooking parameter corresponds to the value of the cooking parameter specific to the food item to be considered cooked to the desired degree.

13. The method according to claim 12 further comprising:
in response to said detecting, initiating a post cooking action including at least one of: lowering a temperature of the heating element from a temperature of the heating element during the predetermined cooking mode, deactivating the heating element, causing presentation of at least one of an audible and a visible alert indicating that cooking of the food item is complete.

14. The method according to claim 13, wherein the post cooking action is performed automatically in response to said detecting that cooking of the food item is complete without human intervention.

15. The method according to claim 12, wherein said detecting that cooking of the food item is complete comprises receiving a temperature indication signal from a thermometer operatively connected to communicate with the control unit, comparing a temperature corresponding to the temperature indication signal to a target temperature, and determining that cooking of the food item is complete when the temperature corresponding to the temperature indication signal is greater than or equal to the target temperature.

16. The method according to claim 15, wherein the temperature sensor is at least partially inserted into the food item and the temperature corresponding to the temperature indication signal is an internal temperature of the food item being cooked within the cooking cavity.

17. The oven according to claim 1, wherein the control unit comprises a microprocessor and the oven further comprises a memory operatively connected to the microprocessor, the memory storing a desired value of the internal property to be established during the predetermined cooking mode that is customizable by the cook to be stored in the memory as the desired value of the internal property to be achieved during a subsequent initiation of the predetermined cooking mode.

* * * * *